(12) United States Patent
Russell

(10) Patent No.: US 6,404,565 B2
(45) Date of Patent: Jun. 11, 2002

(54) MAGNIFYING SCOPE WITH SPECIMEN HOLDERS

(76) Inventor: Bruce J. Russell, P.O. Box 457, Loomis, CA (US) 95650

( * ) Notice: Subject to any disclaimer, the term of this patent is extended or adjusted under 35 U.S.C. 154(b) by 0 days.

(21) Appl. No.: 09/752,752

(22) Filed: Dec. 30, 2000

Related U.S. Application Data

(60) Provisional application No. 60/174,843, filed on Jan. 7, 2000.

(51) Int. Cl.[7] ............................................. G02B 27/02
(52) U.S. Cl. ........................ 359/804; 359/391; 359/801
(58) Field of Search ............................... 359/381, 392, 359/391, 393, 368, 801, 802, 803, 804, 805, 806

(56) References Cited

U.S. PATENT DOCUMENTS

| | | | | |
|---|---|---|---|---|
| 1,881,072 A | * | 4/1932 | Fiske | 359/806 |
| 3,656,840 A | * | 4/1972 | Smith et al. | 359/804 |
| 4,428,648 A | * | 1/1984 | Wiley | 359/801 |
| 4,737,016 A | * | 4/1988 | Russell et al. | 359/801 |
| 5,062,697 A | * | 11/1991 | Mitchell | 359/379 |
| 5,844,714 A | * | 12/1998 | DiResta | 359/368 |
| 5,999,339 A | * | 12/1999 | Kam et al. | 359/803 |

* cited by examiner

Primary Examiner—Cassandra Spyrou
Assistant Examiner—Mark A. Robinson
(74) Attorney, Agent, or Firm—Roger A. Marrs

(57) ABSTRACT

A magnifying scope and accessory holder having a main body having an upper end of reduced dimension for supporting a viewing aperture including an eye cup and window arrangement and a lower portion that includes an open-ended bore occupied by a focus tube in the form of a movable cylinder. The eye cup and window arrangement further includes a viewing lens which is of a suitable magnifying power. A mount is carried on the end of the focusing tube cylinder that detachably receives a variety of specimen holders.

1 Claim, 1 Drawing Sheet

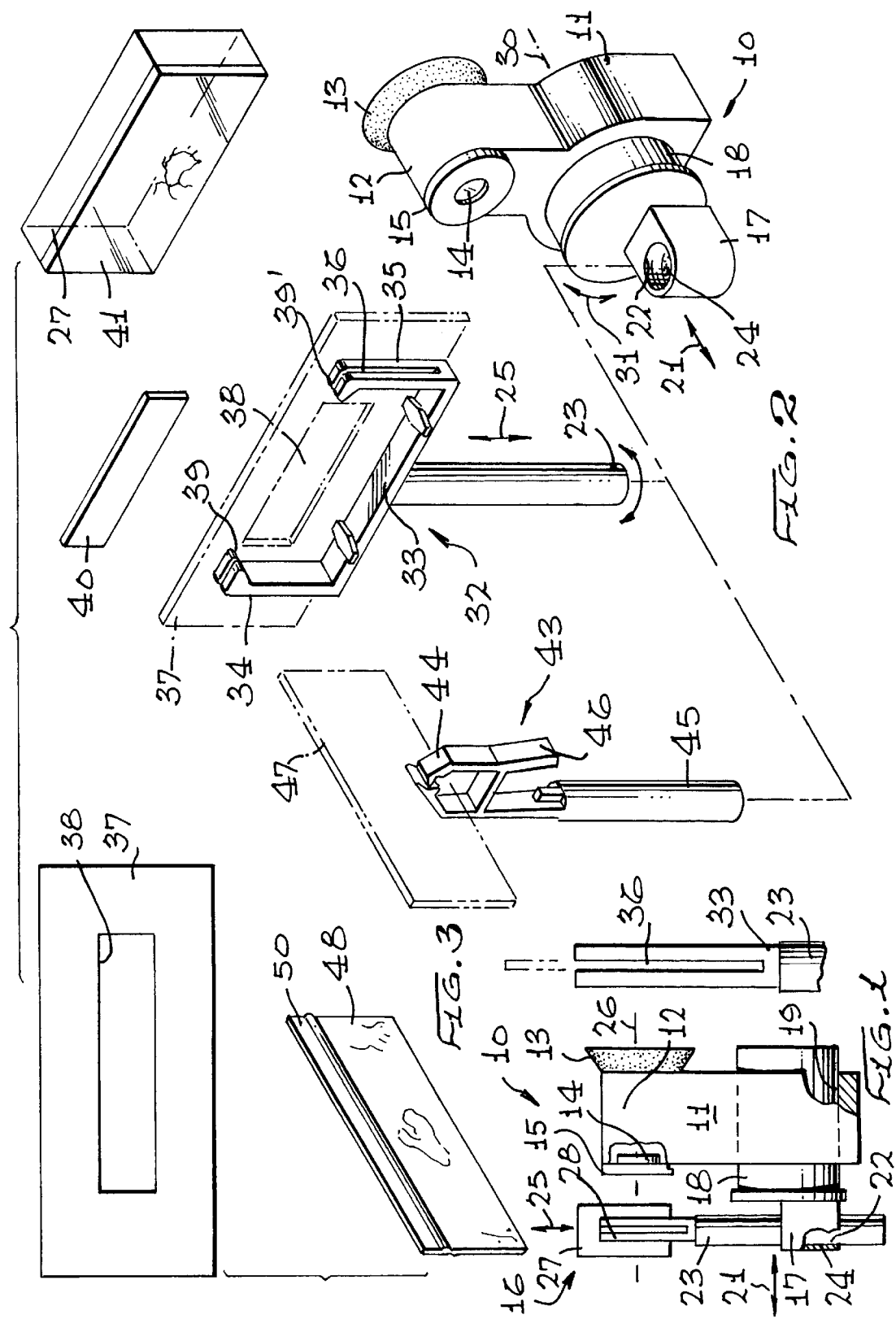

MAGNIFYING SCOPE WITH SPECIMEN HOLDERS

Priority based on Ser. No. 60/174,843 filed Jan. 7, 2000.

BACKGROUND OF THE INVENTION

1. Field of the Invention

The present invention relates to the field of microscopes, and more particularly to a novel magnifying scope having a releasable attachment means for accommodating a variety of specimen holders wherein specimens may be readily moved with the holders in a rotary movement about a vertical axis and/or may be moved towards or away from the scope to achieve focus and which may be moved side-to-side for a specimen observation and checkout.

2. Brief Description of the Prior Art

In the past, a variety of microscopes and magnifying glasses have been employed for permitting review of selected specimens. In some instances, the specimens may be liquid, three-dimensional such as a coin, or may be a sheet of material that is rigid or may flex, such as a leaf or the like. Conventional microscopes do not include holders for retaining the specimen to be observed in such a manner that proper focus can be gained as well as selectively orienting the specimen so that it can be seen from all sides. In most instances, the microscope includes a platform on which the specimen is placed and generally employs clips, elastic bands or slides on which liquid can be placed in order that the microscope of the device can be properly focused with respect to the fixed positioned specimen. In some prior instances, the microscope may include the specimen plate or glass on a portion of the focusing mechanism whereby the lenses of the microscope can be moved with respect to the specimen so that a unitary construction is provided.

Problems and difficulties have been encountered when using such conventional microscopes and magnifying devices which stem largely from the fact that specimen holders are not universal so as to be able to retain liquids, three-dimensional items or sheet items such that a unitary construction may be provided that will accommodate a plurality of different specimen holders. Conventional microscopes do not include a universal mounting means whereby a variety of specimen holders can be mounted in an interchangeable manner so that a variety of specimen substances and/or items can be investigated. Also, most conventional microscopes do not provide the mounting of specimen holders directly on the microscope itself but usually resides on support frames or other types of stationary mountings to which the microscope is detachably carried. Thus, portability of the device for use in the field is awkward and cumbersome.

Therefore, a long-standing need has existed to provide a novel magnifying scope which will accommodate the mounting of a variety of specimen holders whereby the microscope may be used conveniently in the field and is therefore portable and convenient. The device should be of simple construction permitting focus and full rotation of the specimen holders so that full observation of the specimen can be obtained without complexity.

SUMMARY OF THE INVENTION

Accordingly, the above difficulties and problems have been avoided by the present invention which provides a novel magnifying scope and accessory holder which includes a main body having an upper end of reduced dimension for supporting a viewing aperture including an eye cup and window arrangement and a lower portion that includes an open-ended bore occupied by a focus tube in the form of a cylinder. The eye cup and window arrangement further includes a viewing lense which is of a suitable magnifying power. A feature of the scope resides in providing a mounting means carried on the end of the focusing tube cylinder that detachably receives a variety of specimen holders. The attachment means includes an open bore which is lined with frictional material that may be sponge-like or of fabric which permits the insertion of a shaft or post therein so that the post may be rotated or moved up and down while once positioned, frictional engagement will hold the post in place. The post or shaft includes a specimen carrying end which may support a variety of specimen holders, such as slides, enclosed chambers or sheet or bag material. The post is provided with a holding means specific for releasably retaining any one of the aforementioned type holders. Such means may take the form of a releasable clamp, an enclosed chamber held within a yoke structure or a yoke structure having openings for supporting a sheet material.

Therefore, it is among the primary objects of the present invention to provide a novel magnifying scope or device which includes a focusing mechanism for detachably mounting a plurality of specimen holders so that a variety of specimens can be observed and studied.

Another object of the present invention is to provide a novel magnifying scope or device which includes a plurality of specimen holders carried on a device which may be rotated as well as moved rectilinearly on the focusing means for the magnifying device.

Another object of the invention resides in providing a plurality of specimen holders which is portable with the magnifying device so that it is readily usable in field operations and which is suitable for observing and analyzing specimens which are liquid, solid, three-dimensional and or flexible.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a side elevational view, partly in section, of the inventive magnifying scope incorporating the present invention;

FIG. 2 is an enlarged exploded view illustrating the magnifying device of the present invention which operates with a variety of specimen holders; and FIG. 3 is an enlarged side elevational view of a holder for accepting sheet material.

DESCRIPTION OF THE PREFERRED EMBODIMENT

Referring to FIG. 1, the novel magnifying scope with accessory specimen holders is illustrated in the general direction of arrow 10 which includes a main body 11 having an upper portion 12 which supports an eye cup 13 in alignment with an internal magnifying lense 14 mounted in a fixture 15 so that an optical axis is produced for viewing specimens carried on a holder. The holder is indicated in the direction of arrow 16 and is carried on an outwardly projecting holder element 17 fixedly carried on the end of a focusing cylinder 18. The cylinder 18 moves within a bore 19 in the lower portion 11 of the body. The focusing cylinder 18 may be moved in a rectilinear direction, as indicated by arrows 21 when grasped by the fingers of the user. The outwardly projecting holder element 17 includes an open-ended bore 22 into which a shaft or post 23 of the holder 16 is slidably and rotatably carried. The bore 22 carries a friction material such as a sponge or fabric 24 so as to bear against the external surface of the post or shaft 23 and thereby retain the post in the position established by the user. The arrow 25 indicates vertical adjustment of the post holder 23 within the bore 22. The upper end of the post or shaft 23 includes a holder for a chamber or a sheet specimen holder and is indicated by numeral 27. The specimen holder is detachably carried by side elements 28 integrally formed on the end of post 23. The specimen within the specimen holder 27 is placed on an optical axis 26 through the lense 14 and eye piece 13 and focus is achieved by moving the focusing cylinder 18 in the direction of arrows 21.

Referring now in detail to FIG. 2, it can be seen that the bore 22 in mounting element 17 includes a lining 24 of material intended to provide an interference fit with the shaft 23 of the specimen holder means. Also, in addition to the focusing tube 18 being moved rectilinearly in the direction of arrows 21, the tube may be rotated about an axis 30 in the direction of arrows 31. This assists not only in focusing but in observation of the specimen so that the specimen can be scanned side-to-side.

FIG. 2 also illustrates that the specimen holder, as indicated in the direction of arrow 32, includes not only the shaft or post 23 but includes a yoke 33 carried on one end and that the sides of the yoke are provided with arms 34 and 35 that include slits such as slit 36 into which a rigid sheet of cardboard, glass or the like may be inserted. The sheet or glass is indicated by numeral 37 and may include a window 38 that is occupied by a punchout panel 40. Therefore, a specimen may be placed on the panel 40 and then inserted into the opening 38 of the sheet 37 and the sheet may then be installed on the yoke 34 by fitting into the slots 36 on their respective arms 34 and 35. The panel 40 will then be lying along the optical axis 26 when the shaft 23 is inserted into the bore 22. If desired, a chamber 27 may be placed between lugs 39 and 39' of the arms 34 and 35 such as shown in FIGS. 1 and 2, so that a captured specimen can be observed or a liquid may be included. Preferably, the chamber 27 is of a rigid box-like structure including a removable lid 41 so that a specimen, such as a live animal or insect, or so that liquid can be introduced to the storage cavity inside the chamber.

Furthermore, another accessory holder is indicated in the direction of arrow 43 that includes a clamp 44 at the top end of a post 45 which is identical to the post 23 as previously described. The clamp 44 includes a finger pressure level 46 that is used to open and close the clamp 44 about sheet material that carries a suitable specimen and the sheet material is indicated by numeral 47.

FIG. 2 also illustrates that a specimen may be carried within a transparent or translucent bag 48 and that the bag may have a zip-lock closure 50 for gaining access to the interior thereof. The bag may contain a liquid or a solid specimen element and the bag may be placed in use by either the gripper or clamp 44 on post 45 or, if suitable, may be inserted through the slits 36 in the arms 34 and 35 on the yoke element 33.

FIG. 3 illustrates more clearly the slits 36 on the yoke 33 as carried by the post or shaft 23.

Therefore, in view of the foregoing, it can be seen that the magnifying scope and the variety of specimen holders provide a rugged, hand-held, wide-field microscope which is useful for viewing the incredible variety of small living things found in every lawn, garden, roadside puddle, seashore or the like. Initially, the user places the specimen or subject in front of the lense 14 and brings the scope up in front of the user's eye while holding the body 11 in a steady position. Slowly, the user moves the focusing tube 18 in or out of the body 18 to bring the specimen into focus. The specimen would be held on any one of the holders indicated as examples by numerals 16, 32, 43 or the like. The focus tube cylinder 18 will also rotate, as indicated by numeral 31, from side-to-side allowing the user to see each side of the specimen, such as when included within the chamber 27. The holder or tool may be moved up and down and rotated 360° in the tool holder 17. Employing all of the movements combined, the user can focus on any part of the specimen held in the yoke 33 or any items held in the gripper or clamp 44.

The chamber holder 27 is held in position by a slight pressure exerted by the arms 34 and 35 of the yoke 33. The user uses a small amount of pressure to make the holder accept the chamber 27. The ends also have slots 36 that are used to hold a slide or sheet of material or even the bag 48 as well as prepared slides or any other items in place. The clamp or gripper 44 opens in a similar fashion to a clothespin and will hold any small item that the user wishes to observe, small flowers, pebbles, minerals, yarn, coins or anything that can be placed in the clamp.

The chamber 27 is composed of a clear transparent or translucent material and is used to hold insects, worms, pond water samples or the like. The bag 48 is closable at the top in a similar fashion of conventional plastic bags and fits into the slots 36 of the yoke 33. The bag may be used to put hard-bodied insects in position for observation or the bag may be used for aquatic study. Slides, such as slide 47, may be of cardboard with a cutout center that fits into the slots 36 of the yoke 33. With transparent tape covering the cutout portion, the user can make an instant slide of anything that will stick to the tape. Preferably, the tape will cover the opening or window 38 after the panel 40 has been removed. Items such as sand, plant parts, hair or other specimens may be held on the tape.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A magnifying scope with specimen holder comprising:
    a main body having an upper portion supporting a viewing device and a lower portion movably supporting a focus tube;
    said focus tube and said viewing device each having a respective central axis parallel and spaced-apart with respect to each other with said focus tube movable longitudinally along said central axis and rotatable about said central axis;
    a specimen holder detachably mountable on a selected end of said focus tube and further having a mounting shaft downwardly depending from a specimen carrying end;
    said focus tube provided with an open-ended bore lined with a friction material for insertably receiving and removably supporting said shaft of said specimen holder;

said friction material movably supports said shaft permitting longitudinal displacement and rotatable displacement of said specimen holder through said central axis of said viewing device;

said shaft is elongated having opposite ends with a selected end supporting said specimen holder and a non-selected end releasably disposed in said open-ended bore;

said selected end of said shaft includes a yoke having spaced-apart, parallel arms carried on opposite ends of a cross member;

each of said arms having a slot for insertably receiving said specimen holder;

said specimen holder is a box having transparent front and rear panels defining a specimen cavity therebetween; and said arms include a pair of opposing lugs for frictional engagement with said box to removably support said box between said lugs on said yoke.

* * * * *